(12) United States Patent
Schillings (10) Patent No.: US 9,826,366 B2
(45) Date of Patent: *Nov. 21, 2017

(54) LOW KEY POINT OF INTEREST NOTIFICATION

(71) Applicant: Yahoo! Inc., Sunnyvale, CA (US)

(72) Inventor: Benoit Schillings, Los Altos, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,745

(22) Filed: Jul. 8, 2016

(65) Prior Publication Data
US 2016/0323714 A1 Nov. 3, 2016

Related U.S. Application Data (63) Continuation of application No. 14/145,666, filed on Dec. 31, 2013, now Pat. No. 9,392,414.

(51) Int. Cl.
*H04W 4/02* (2009.01)
*H04W 64/00* (2009.01)
*H04W 4/12* (2009.01)

(52) U.S. Cl.
CPC ............ *H04W 4/026* (2013.01); *H04W 4/027* (2013.01); *H04W 4/12* (2013.01); *H04W 64/006* (2013.01)

(58) Field of Classification Search
CPC ....... H04W 4/027; H04W 4/12; H04W 4/026; H04W 64/006; H04L 29/08657; G06Q 30/0261; G01C 21/30

USPC ........... 455/456.1, 418; 705/14.54, 14.49, 58
See application file for complete search history.

(56) References Cited

U.S. PATENT DOCUMENTS

| | | | |
|---|---|---|---|
| 2013/0304578 A1* | 11/2013 | Kannan | G06Q 30/0261 705/14.54 |
| 2015/0168159 A1* | 6/2015 | Chao | G01C 21/30 701/428 |
| 2015/0189475 A1 | 7/2015 | Schillings | |

OTHER PUBLICATIONS

Mobile device, Wikipedia, the free encyclopedia, Jan. 7, 2014 downloaded from http://en.wikipedia.org/wiki/mobile_device.
Google Glass, Wikipedia, the free encyclopedia, Jan. 6, 2014, downloaded from http://en.wikipedia.org/wiki/Google_Glass.
Location-based service, Wikipedia, the free encyclopedia, Jan. 1, 2014, downloaded from http://en.wikipedia.org/wiki/Location-based_service.
Augmented reality, Wikipedia, the free encyclopedia, Jan. 9, 2014, downloaded from http://en.wikipedia.org/wiki/Augmented_reality.
U.S. Appl. No. 14/145,666, Office Action dated Mar. 15, 2015.
(Continued)

*Primary Examiner* — Phuoc H Doan
(74) *Attorney, Agent, or Firm* — Weaver Austin Villeneuve & Sampson LLP (57) ABSTRACT

In one embodiment, a location of a mobile device may be obtained. A direction of movement of the mobile device may be ascertained. A field of vision of a user of the mobile device may be determined based, at least in part, on the location of the mobile device and the direction of movement of the mobile device. A user profile associated with the user and/or the mobile device may be identified. A notification may be provided via the mobile device based, at least in part, upon the user profile and the field of vision of the user.

20 Claims, 6 Drawing Sheets

(56) References Cited

OTHER PUBLICATIONS

U.S. Appl. No. 14/145,666, Office Action dated Aug. 20, 2015.
U.S. Appl. No. 14/145,666, Office Action dated Dec. 2, 2015.
U.S. Appl. No. 14/145,666, Notice of Allowance dated Mar. 20, 2016.

* cited by examiner

LOW KEY POINT OF INTEREST NOTIFICATION

RELATED APPLICATIONS

This application is a continuation application and claims priority from U.S. patent application Ser. No. 14/145,666, entitled "Low Key Point of Interest Notification," by Benoit Schillings, filed on Dec. 31, 2013, which is incorporated in its entirety by reference for all purposes.

BACKGROUND

The disclosed embodiments relate generally to methods and apparatus for providing notifications via mobile devices.

Augmented reality is a live, direct or indirect, view of a physical real-world environment whose elements are augmented by computer-generated sensory input such as sound, video, or graphics. As a result, augmented reality may enhance an individual's current perception of reality. Augmented reality may be implemented via devices such as head-mounted devices or handheld devices.

A head-mounted display (HMD) is a display device paired to a headset such as a harness or helmet. HMDs typically place images of both the physical world and virtual objects over the user's field of view. However, HMDs are cumbersome and may be undesirable due to their awkward appearance.

Handheld devices typically employ a small display that fits in a user's hand. Handheld devices provide advantages due to their size and portable nature. Unfortunately, the user must hold the handheld device out in front of them at all times to achieve the effects of augmented reality.

SUMMARY

The disclosed embodiments enable automated notifications to be provided via devices such as mobile devices. This may be accomplished by determining a field of vision of the user and providing notifications based, at least in part, upon the field of vision of the user.

In accordance with one embodiment, a location of a mobile device may be obtained. In addition, a direction of movement of the mobile device may be ascertained. A field of vision of a user of the mobile device may be determined based, at least in part, on the location of the mobile device and the direction of movement of the mobile device. A notification may be provided via the mobile device based, at least in part, upon the field of vision of the user.

In accordance with another embodiment, the notification may be provided based, at least in part, upon a user profile. More particularly, a location of a mobile device may be obtained. In addition, a direction of movement of the mobile device may be ascertained. A field of vision of a user of the mobile device may be determined based, at least in part, on the location of the mobile device and the direction of movement of the mobile device. A user profile associated with the user and/or the mobile device may be identified. A notification may be provided via the mobile device based, at least in part, upon the user profile and the field of vision of the user.

Various embodiments may be implemented via a device comprising a processor, memory, and a display. The processor and memory are configured to perform one or more of the above described method operations. Other embodiments may be implemented via a computer readable storage medium having computer program instructions stored thereon that are arranged to perform one or more of the above described method operations.

These and other features and advantages of the disclosed embodiments will be presented in more detail in the following specification and the accompanying figures which illustrate by way of example the principles of the disclosed embodiments.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In accordance with various embodiments, automated notifications may be provided via a mobile device, which may also be referred to as a portable device or a handheld device. Examples of a mobile device include, but are not limited to, a cellular telephone, a smart phone, a display pager, a Personal Digital Assistant (PDA), a handheld computer, a tablet computer, and a laptop computer, The notification may be provided in a non-intrusive manner. For example, the notification may be an auditory notification or a vibration. Accordingly, a user need not look at their mobile device to receive such notifications.

Various embodiments may be implemented, at least in part, by a mobile device and/or a remotely located server that is located in a remote location with respect to the mobile device. An example system in which various embodiments may be implemented are described in further detail below with reference to FIG. 1.

Example System

Figure 1:
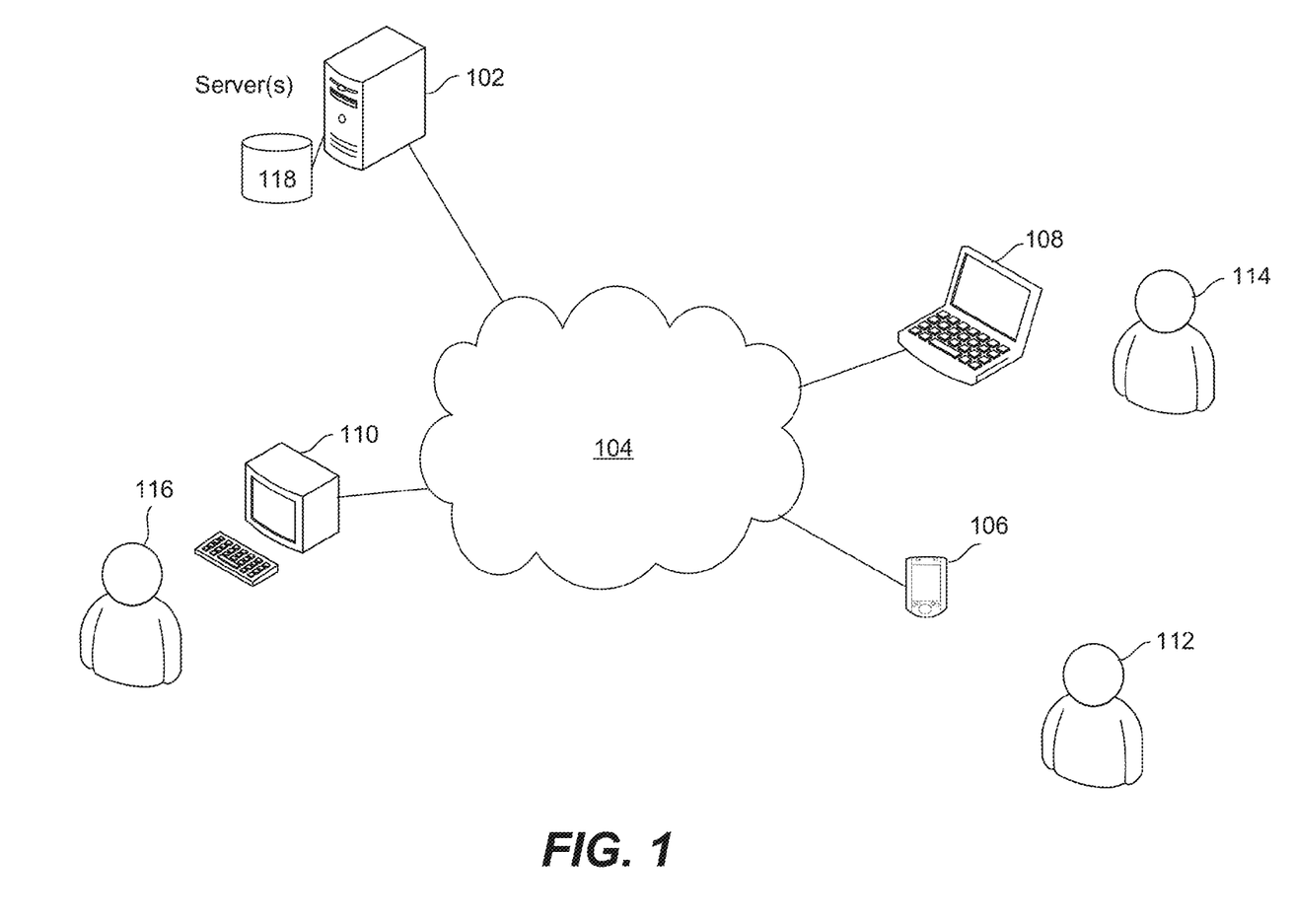
FIG. 1 is a diagram illustrating an example system in which various embodiments may be implemented.

FIG. 1 is a diagram illustrating an example system in which various embodiments may be implemented. As shown in FIG. 1, the system may include one or more servers 102. In accordance with various embodiments, the servers 102 may be associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, users of the web site may perform activities such as access user accounts or public user profiles, interact with other members of the web site, transmit messages, upload files (e.g., photographs, videos), purchase goods or services, access information or content posted on the web site, etc.

In this example, the server(s) 102 may obtain or otherwise receive data (e.g., account data and/or user profile) and/or requests (e.g., requests to access the web site, search requests or account requests pertaining to a particular user account). Requests may include requests sent via the Internet 104 from one or more devices 106, 108, 110 in association with corresponding users 112, 114, 116, respectively. The server(s) 102 may personalize content to be provided to users, either automatically or in response to requests. In addition, the server(s) 102 may automatically transmit or initiate notifications or otherwise support the transmission of notifications to be received via mobile device(s) such as 106 and 108, as will be described in further detail below.

The server(s) 102 may have access to one or more data stores 118 that are coupled to the server(s) 102. Each of the data stores 118 may include one or more memories. The data stores 118 may store account information (e.g., data) for a plurality of user accounts and/or user profiles, content, and/or other information supporting the automated initiation or transmission of notifications.

In order to simplify the following description, it is assumed that the device 106 is a mobile device of the user 112. However, it is important to note that a user may have multiple mobile devices. Notifications may be transmitted via one or more mobile devices for a given user.

In accordance with various embodiments, the server(s) 102 and/or mobile device 106 may provide notifications to its users via their mobile devices for points of interest that are in front of the user. Stated another way, the server(s) 102 and/or mobile device 106 may provide notifications to its users via their mobile devices for points of interest that are in the field of vision of the user. Therefore, the notifications may be provided based, at least in part, upon a field of vision of the user.

Generally, the field of vision may refer to the area that is visible to an immobile eye at a given time. Stated another way, the field of vision may refer to the entire view encompassed by the eye trained in any particular direction. The field of vision may be the whole extent of the image falling on the retina when the eye is fixating on a given point in space. Thus, the field of vision may be the space or range within which objects are visible to immobile eyes at a given time.

While it may not be possible to precisely define an exact field of vision of the user, it is possible to estimate a field of vision of the user. In some implementations, an approximate field of vision of the user may be determined based, at least in part, upon a location of the user's mobile device and the direction in which the user of the mobile device is facing. The direction in which the user of the mobile device is facing may be assumed based upon the dominant direction in which the user is moving or has most recently moved. For example, a Global Positioning System (GPS) and/or accelerometer may be implemented to estimate a dominant forward motion. In some implementations, a transformation may be applied to ascertain an orientation of the mobile device (e.g., in a pocket of the user) with respect to the direction that the user is facing. The orientation of the mobile device may further assist in approximating the field of vision of the user.

Notifications may be provided to notify the user of possible or probable points of interest within the field of vision of the user. To identify possible or probable points of interest, objects in the user's field of vision may be identified. Various methods of identifying objects in the user's field of vision will be described in further detail below.

In some embodiments, objects in the user's field of vision may be identified, at least in part, by accessing a resource (e.g., local or remotely located) such as a map. In addition, it is possible to determine whether any of the identified objects might be of general significance. For example, it is possible to determine from a map that an object in the user's field of vision is a national landmark. As a result, points of interest may be those that may be deemed to be of general significance or likely to be of interest to a majority of users. In some implementations, those identified objects that are likely to be of interest to the particular user may be selected, as will be described in further detail below.

In addition, objects in the user's field of vision may be identified, at least in part, by performing perform pattern recognition. For example, by performing pattern recognition, it may be possible to ascertain that an animal is in the road. Since the identified object poses a safety issue, the animal may be determined to be a point of interest. As another example, it is possible to identify a two-dimensional image of an object presented in a digital image or video.

Moreover, in some embodiments, it may be possible to detect signals emitted from other devices or entities, which may enable objects in the user's field of vision to be identified. For example, by detecting unique signals emitted from other mobile devices, individuals in the field of vision of the user may be identified. By cross-referencing a resource such as the user's contacts list, it is possible to identify the individuals in the user's field of vision as the user's contacts or friends, and therefore points of interest of the user. Accordingly, points of interest may be identified via signals and/or resources that need not include a user profile.

In accordance with various embodiments, the server(s) 102 and/or mobile device 106 may provide or initiate notifications to the mobile device 106 based, at least in part, upon a user profile. More particularly, the server(s) 102 and/or mobile device 106 may ascertain when a notification is appropriate based, at least in part, upon the user profile. The user profile may be associated with a user of the mobile device 106 and/or may be associated with the mobile device 106.

By accessing a pertinent user profile, potential points of interest within the user's field of vision may be identified. In some embodiments, objects in the user's field of vision may be identified by accessing resource(s) (e.g., a map and/or user contact list), performing pattern recognition, and/or detecting signals emitted via other devices or Radio Frequency Identifier (RFID) tags. It is then possible to ascertain from the user's profile whether any of the identified objects might be of interest to the user. Such points of interest may be implicit (e.g., based upon information automatically gathered with respect to the user) and/or explicit (e.g., based upon interests or notification preferences specified by the user in the user profile and/or as specified in another resource such as a user contact list). For example, potential points of interest of the user may include one or more individuals (e.g., friends or contacts of the user), a store, product(s), etc.

A user profile maintained at the server(s) 102 and/or the mobile device 106 may include a set of notification preferences. While notification preferences may be associated with particular individual(s), notification preferences may also be associated with one or more particular mobile device(s). For example, where a user has multiple mobile devices, the notification preferences in the user profile may associate notification preferences with a specific one of the mobile devices. As another example, the user may wish to associate different notification preferences with different devices.

A set of notification preferences may include one or more notification preferences. Each notification preference may be associated with a particular user and/or mobile device(s). A user may be identified by an identifier such as a username, an email address, deoxyribonucleic acid (DNA), retina scan, fingerprint, and/or other identifying information. A mobile device may be identified by an identifier such as an Internet Protocol (IP) address.

Notification preferences may be established as a set of default notification preferences. Moreover, users may establish notification preferences or modify existing notification preferences. Notification preferences may be established via the web site and/or may be generated locally at the mobile device 106. As set forth above, user profile(s) including notification preferences may be stored remotely by the server(s) 102 (e.g., at the data store(s) 118) and/or locally at the corresponding mobile devices 106, 108, 110.

The notification preferences may indicate or specify condition(s) that, when satisfied, trigger the sending of a notification. Notifications may be sent in the same manner regardless of the condition that is satisfied. Alternatively, a notification preference may be associated with a particular condition such that upon satisfaction of the particular condition, the corresponding notification is provided or initiated. For example, the user may wish for a vibration to be sent to the user when the user walks North, and a particular audio notification to be sent to the user when the user walks South. The notification preference may indicate or specify a number of notifications to be provided, a length of time that a notification is to be provided, a type of notification (e.g., audio or vibration), event(s) that would terminate the notification, a mobile device via which the notification is to be provided, and/or volume of the notification. In some instances, some aspects of the notification may be determined independent from the notification preferences. For example, where a user approaches a particular store, a particular audio message may be presented to the user that tells the user that the store is offering 25% off of all store items.

In accordance with various embodiments, content or notifications may be personalized for an individual (or a group of individuals) based, at least in part, upon a user profile of the individual. Examples of information that may be maintained in a user profile will be described in further detail below.

A user profile may be updated under various circumstances. As will be described in further detail below, an enormous amount of information may be collected via web sites based upon various interactions (or lack thereof) of individuals with the content provided via the web sites. For example, the web sites may ascertain whether the individuals access specific content, which may or may not have been recommended by the web sites. As another example, the web sites may record a number of clicks by individuals to various content items. In addition, the user profile may be updated based upon content or applications accessed via a mobile device (e.g., in response to messages or requests transmitted by the mobile device to the server(s)) 102. Information indicating responses of the users to notifications (or lack thereof) may also be collected. Using the collected information, the experience of the users may be personalized via the server(s) 102 and/or other devices such as mobile devices.

When a notification is provided to a user via a mobile device, information pertaining to the response of the user to the notification (or lack thereof) may be collected. More particularly, the information may indicate whether the user responds to the notification, a time that lapses between the notification and the user's response, and/or a further action of the user with respect to a point of interest that is the subject of the notification. For example, where a notification pertains to a store of interest to the user, the mobile device may ascertain whether the user enters the store or purchases a product at the store. This information may be stored locally at the mobile device and/or may be transmitted to the server(s) for use in updating the corresponding user profile. For example, such updating may be performed at the server(s) and/or the mobile device according to a machine learning algorithm.

The information that is obtained by the server(s) 102 may be stored in the data stores 118. More particularly, the information may be stored, maintained, and/or updated in the data stores 118 such that the information is associated with the corresponding user. The information may include that gathered or obtained by the server(s) 102 as well as that received from other device(s), which may include a mobile device. A description of the information that may be stored, maintained, and updated in the data stores 118 will be described in further detail below.

Data Stores and User Profiles

The data stores 118 may store content or references to content, which may include content items, hypertext links via which content items may be accessed, and/or URLs via which content items may be accessed. The content may be indexed for efficient retrieval.

Content may include digital media items, which may include text, audio, video, photographs, and/or other images. For example, digital media items may be accessed via a corresponding Uniform Resource Locator (URL). The term content as used herein may refer to a collection of content or a specific content item, which may be one of a plurality of content items within a collection of content.

Content accessible via the Internet may be contained within an object, such as a Web object, web page, web site, electronic document, or the like. An item in a collection of content may be referred to as an "item of content" or a "content item," and may be retrieved from a "Web of Objects" comprising objects made up of a variety of types of content. For example, a newspaper available via a particular web site may serve as a collection of content that includes a plurality of content items.

In addition, the data stores 118 may store information such as the characteristics of the content, which may be stored in association with the content. More particularly, the content may be a collection of content or a specific content item, which may be one of a plurality of content items within a collection of content. For example, the characteristics of the content may indicate information such as an identifier of a content item (e.g., a pointer to a digital version of a content item or title of the content item), a primary subject or topic of the content item, one or more key words, results of analysis of the content item, one or more content categories indicating subject matter to which the content item relates, and/or an author or source of the content item.

Content and/or characteristics of content within a repository of media or multimedia within the data stores 118 may be annotated. Examples of content may include text, images, audio, video, or the like, which may be processed or stored in memory. The term "annotation," as used herein, refers to descriptive or contextual content related to a content item, for example, collected from (or transmitted to) an individual, such as a user, and stored in association with the individual or the content item. Annotations may include various fields of descriptive content, such as a rating of a document, circumstances or context pertaining to the receipt of a document, a list of keywords identifying topics of a document, etc.

In some embodiments, as an individual interacts with a software application or a device such as a mobile device, descriptive content such as, for example, a date and/or time, may be identified and stored in the data stores 118 such that the descriptive content is stored in association with content. Descriptive content may also be stored along with contextual content. For example, how content such as a content item came to be identified (e.g., it was contained in a particular web page) may be stored in the data stores 118 as contextual content associated with the content. Contextual content, therefore, may identify circumstances surrounding receipt of content (e.g., date or time a content item was received or consumed and/or a source of the content item) and may be associated with descriptive content in the data stores 118. Contextual content, may, for example, be used to subsequently search for associated descriptive content. Accordingly, this additional contextual content and/or descriptive content may enable personalization to be performed based upon the information that is most likely to be relevant.

In addition, the data stores 118 may include account information (e.g., data) for a plurality of user accounts. Therefore, account information pertaining to user accounts may be retained in one or more memories that are coupled to the server 102.

The account information retained in the data stores 118 may include financial information such as credit card information, enabling goods or services provided in association with the account to be purchased. In addition, the account information may include information pertaining to goods or services available to the user via the user account or used by the user. More particularly, the account information may indicate an amount and/or quality of the goods or services available to the user or used by the user. In addition, the account information may indicate a cost associated with the amount and/or quality of goods or services available to the user or used by the user.

The account information may also include or be linked to additional information pertaining to the user. For example, the server(s) 102 may have access to additional user information, which may be retained in one or more user logs stored in the data stores 118. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)). In accordance with various embodiments, as an individual consumes content provided via a web site or via a device such as a mobile device, the user profile may be updated.

A profile builder may initiate generation of a profile, such as for users of an application, including a search engine or messaging application, for example. A profile builder may initiate generation of a user profile for use, for example, by a user, as well as by an entity that may have provided the application. For example, a profile builder may enhance relevance determinations and thereby assist in indexing, searching or ranking search results, as well as assist in the identification of further content to be provided via various media. Therefore, a provider such as a search engine provider may employ a profile builder.

A variety of mechanisms may be implemented to generate and/or update a profile including, but not limited to, collecting or mining navigation history, stored documents, tags, or annotations, to provide a few examples. In addition, the profile may be updated with information gathered as a result of the use of a device such as a mobile device. A profile builder may store a generated or updated profile.

Through the use of user profiles, for example, a web site such as a search engine provider may retrieve annotations, tags, stored pages, navigation history, or the like, which may be useful for making relevance determinations of search results, content, and/or objects in the field of vision of a user. Therefore, content or notifications to be provided to users may be identified using the user profiles.

The user information retained in the user logs 118 may include personal information such as demographic information and/or geographic information. Examples of demographic information include age and gender. Examples of geographic information include residence address, work address, and/or zip code.

Each time an individual performs online activities such as clicking on a content item (e.g., an advertisement or media item), purchasing goods or services, sending messages, retrieving messages, accessing a media item, posting information or content, or annotating content, information regarding such activity or activities may be retained as user data in the user logs 118. For instance, the user data that is retained in the user logs 118 may indicate the identity of web sites visited, identity of ads or content items that have been selected (e.g., clicked on) via the web site, and/or a timestamp indicating a date and/or time that the individual viewed or accessed the content item. Moreover, where the online publisher supports a search engine (e.g., via the server 102 or a separate search server), information associated with a search query, such as search term(s) of the search query, information indicating characteristics of search results that have been selected (e.g., clicked on) by the individual, and/or associated timestamp may also be retained in the user logs 118. Thus, the information may indicate whether the individual clicked on or viewed a content item and, if so, the number of clicks or views within a particular time period. An individual may be identified in the user logs 118 by a user ID (e.g., user account ID), email address, DNA, fingerprint, information in a user cookie, etc.

Each user profile may be associated with an individual and/or device, which may be identified by a device identifier such as an Internet Protocol (IP) address. Although user profiles are described with reference to data store(s) 118 coupled to the server(s) 102, such a user profile may also be stored, maintained, and/or updated locally at the mobile device 106.

A user profile may include a set of user preferences. In some embodiments, the set of user preferences includes a set of notification preferences. The set of notification preferences may be a default configuration or may be established by a user, enabling notifications to be sent in accordance with the set of notification preferences. Each notification preference in a set of notification preferences may be associated with a user and/or device. A notification preference may include or otherwise indicate a condition that, when satisfied, triggers the transmission of a notification via a mobile device. In addition, a notification preference may specify or otherwise indicate a manner in which the notification is to be provided. In some embodiments, the set of notification preferences may pertain generally to all notifications transmitted via the mobile device. Example notification preferences include, but are not limited to, manner of transmission (e.g., vibration or audio), volume, length of time notification is to be provided, device identifier identifying the mobile device via which the notification is to be transmitted, condition to be satisfied before the notification is provided, and/or event(s) that will result in termination or cancelling of the notification.

Based upon the information recorded in user profiles, a machine learning algorithm may learn how to identify characteristics of items (e.g., content or points of interest) that may be of interest to individuals (or a similarly situated group of individuals) in the future. Content or notifications pertaining to a point of interest of the user may be provided to the user based, at least in part, upon the information recorded in the user profile Moreover, the server(s) 102 and/or mobile device 106 may be configured to access one or more resources that may include, but are not limited to, map(s), product stockkeeping units (SKUs), and/or user contacts. For example, these resources may be stored in the data store(s) 118 and/or may be accessible via another web site.

Each mobile device 106 may also store a user profile. Information stored in a user profile at the mobile device 106 may be shared with (e.g., transmitted to) the server(s). Similarly, information stored in a user profile at the server(s) 102 may be shared with (e.g., transmitted to) the mobile device(s) 106.

Where a user profile is stored at the mobile device, the locally stored user profile may include less information than a user profile that is stored remotely. For example, the locally stored user profile may include a set of notification preferences, but may not include information pertaining to the user's browsing activity. Therefore, a user profile stored at the mobile device need not be identical to a remotely stored user profile.

Example Embodiments

The disclosed embodiments may be implemented at the server(s) and/or the mobile device. Various example methods of providing a notification will be described in further detail below with reference to FIG. 2 and FIG. 3.

Notification Process

Figure 2:
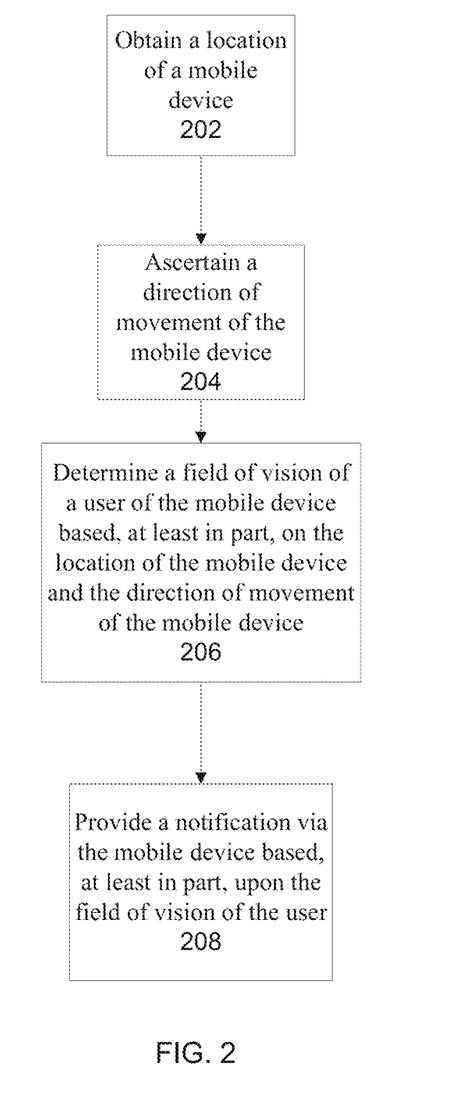
FIG. 2 is a process flow diagram illustrating an example method of providing a notification in accordance with various embodiments.

FIG. 2 is a process flow diagram illustrating an example method of providing a notification in accordance with various embodiments. To provide a notification that is useful to the user, a location of a mobile device that the user has in his or her possession may be obtained at 202 by the server(s) and/or the mobile device. This may be accomplished, for example, via a Global Positioning System (GPS) of the mobile device. The location of the mobile device may alone enable the mobile device to provide a notification. For example, a weather forecast for that location may be provided via the mobile device. However, it would also be beneficial to determine the direction that the user is facing. Since the mobile device may be in the user's pocket or may not currently be in use by the user, the mobile device may be in any position. As a result, it is not possible to use the position of the mobile device to determine the direction in which the user is facing. However, when a user moves (e.g. walks or drives), it may be assumed that the user is facing in the direction in which the user is moving. Thus, a direction of movement of the mobile device may be ascertained at 204 by the server(s) and/or the mobile device. The direction in which the user is moving may be ascertained based, at least in part, upon an accelerometer and/or GPS. Therefore, the current or recent direction of movement of the mobile device may indicate the direction that the user is likely facing.

The server(s) and/or mobile device may determine a field of vision (i.e., visual field) of the user of the mobile device based, at least in part, on the location of the mobile device and the direction of movement (or most recent direction of movement) of the mobile device at 206. More particularly, the field of vision may be an estimated area, which may be defined by a region that may be located on a map. For example, it may be assumed that the user can view objects within a distance of one mile away. The distance may extend in front of the user, as well as to the sides of the user. Thus, the field of vision may be an area in the shape of a semi-circle. As another example, the field of vision may be a triangular area that extends outward from the user. In this manner, a region defining the user's likely field of vision may be estimated.

The server(s) and/or the mobile device may provide a notification at 208 via the mobile device based, at least in part, upon the field of vision of the user. More particularly, the server(s) and/or mobile device may identify one or more points of interest within the field of vision of the user. Points of interest in the field of vision of the user may be identified, for example, via pattern recognition, signal detection, and/or one or more resources. The resources may be local or remotely located. In addition, the resources may include one or more data stores and/or web site(s). Example resources include product databases mapping SKUs to product names and/or characteristics, maps, and contact lists.

The notification may pertain to one or more points of interest within the field of vision of the user. Example points of interest include, but are not limited to, individual(s), object(s) such as products, buildings (e.g, stores), landmarks, etc. For example, the notification may pertain to a coupon for a product or store in the field of vision of the user. In some embodiments, the points of interest may be identified based, at least in part, upon a user profile, as will be described in further detail below with reference to FIG. 3.

The notification may be provided when the point of interest enters into or is in the field of vision of the user. In some instances, the point of interest may be in close proximity to the user. However, the point of interest need not be in close proximity to the user. Rather, the point of interest may simply be visible to the user in the distance.

As described above, notifications may be provided to a user independent from his or her user profile. For example, when the user approaches a particular parking spot in their car, an audio notification stating that street cleaning starts in half an hour may be provided to the user. However, in some instances, it may be desirable to personalize the notification process. Example embodiments for personalizing the notification process will be described in further detail below.

Personalized Notification Process

When a user turns on or otherwise accesses a mobile device, an identity of the user of the mobile device may be ascertained via a variety of mechanisms. In some embodiments, an identity of the user (e.g., owner) of the device may be statically configured. Thus, the device may be keyed to an owner or multiple owners. In other embodiments, the device may automatically determine the identity of the user of the device. For instance, a user of the device may be identified by DNA, a retina scan, and/or finger print. In yet other embodiments, the user may submit an identifier (e.g., username or email address) and/or information for authenticating the user (e.g., password).

In addition, an identifier associated with the mobile device may be obtained. For example, the identifier associated with the mobile device may include an IP address. The identifier may be statically or dynamically configured at the mobile device.

Information including the identity of the user and/or an identity of the mobile device may be transmitted by the mobile device to the server(s). The identity of the user of the mobile device and/or the identity of the mobile device may be used to identify a corresponding user profile. For example, the server(s) may identify the user profile that corresponds to the user and/or mobile device. The server(s) may provide the user profile to the mobile device for use in generating notifications. Alternatively, the server(s) may generate notifications based, at least in part, upon the user profile. In other embodiments, a user profile may be accessed and/or stored locally at the mobile device, which may generate notifications without communicating with an external server.

Notifications may be provided such that they are non-intrusive. Example notifications include vibrations, ring tones, and audio messages.

Figure 3:
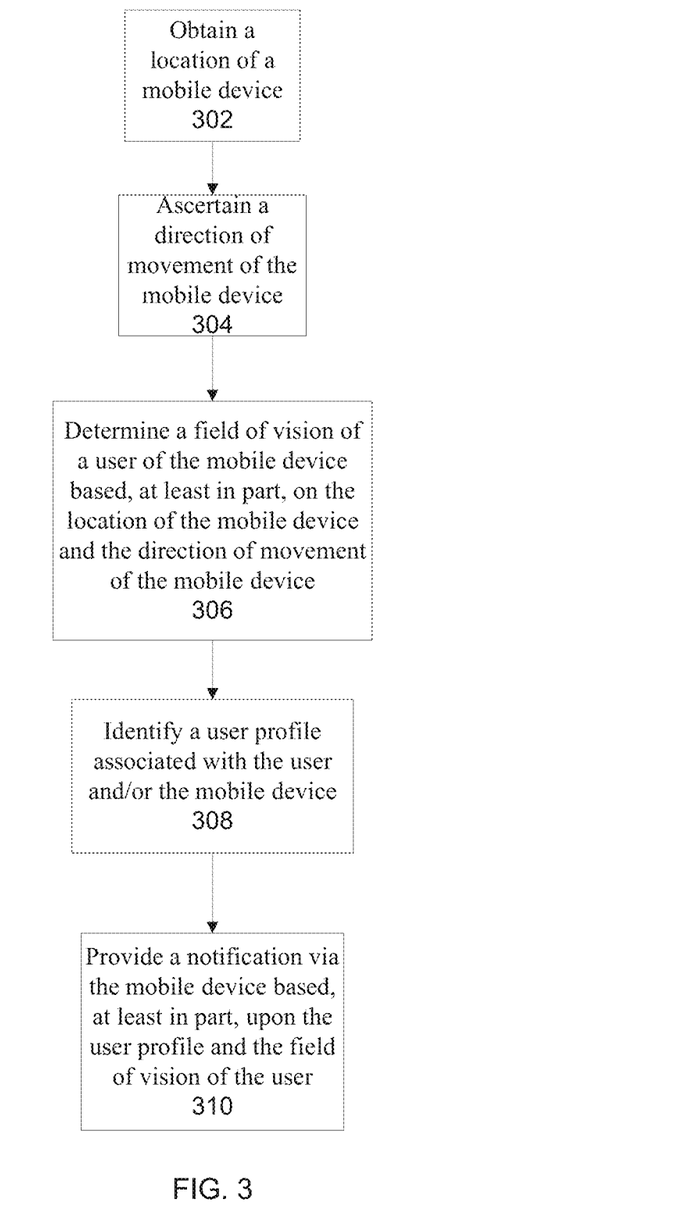
FIG. 3 is a process flow diagram illustrating an example method of providing a personalized notification in accordance with various embodiments.

FIG. 3 is a process flow diagram illustrating an example method of providing a personalized notification in accordance with various embodiments. As described above, a location of a mobile device that the user has in his or her possession may be obtained at 302 by the server(s) and/or the mobile device. This may be accomplished, for example, via a Global Positioning System (GPS) of the mobile device. In addition, a direction of movement of the mobile device may be ascertained at 304. The direction in which the user is moving may be ascertained based, at least in part, upon an accelerometer and/or GPS.

A field of vision (i.e., visual field) of the user of the mobile device may be determined by the server(s) and/or the mobile device based, at least in part, on the location of the mobile device and the current (or most recent) direction of movement of the mobile device at 306. As set forth above, the field of vision may be an estimated area.

A user profile associated with the user and/or the mobile device may be identified at 308 by the server(s) and/or the mobile device. For example, the user profile may be identified based, at least in part, upon a user identifier and/or device identifier. As set forth above, a user profile may include information pertaining to user characteristics of the user that have been explicitly provided by the user and/or have been ascertained via collected data. In addition, a user profile may include user preferences such as notification preferences.

A user profile may be stored at the server(s) and/or the mobile device. Where a user profile is generated and/or stored locally, the user profile or set of notification preferences therein may be transmitted to the remotely located server(s) for storage at the remotely located data store(s). Conversely, where a user profile is generated and/or stored remotely, the user profile or set of notification preferences therein may be identified and transmitted to the mobile device. Therefore, the server(s) and/or mobile device may initiate or provide notifications according to the user profile (and any notification preferences).

The server(s) and/or the mobile device may provide a notification at 310 via the mobile device based, at least in part, upon the field of vision of the user and the user profile. The notification may pertain to one or more points of interest within the field of vision of the user. More particularly, the server(s) and/or mobile device may identify one or more possible points of interest within the field of vision of the user. In some embodiments, the server(s) and/or mobile node may identify possible points of interest in the field of vision of the user via pattern recognition, signal detection, and/or by accessing one or more resources. Example resources include, but are not limited to, maps, user contact lists, and product SKU databases.

A point of interest in the field of vision of the user may be identified based, at least in part, upon the user profile. More particularly, a point of interest that is likely to be of interest to the user may be selected from one of the possible points of interest based, at least in part, upon the user profile. For example, where the user is determined to be interested in wine tasting, the point of interest may be a venue within the user's field of vision that is offering wine tasting. As another example, a set of notification preferences established by the user may indicate that the user wishes to be notified when the user is near a McDonald's restaurant.

The notification may be provided when the point of interest enters into or is in the field of vision of the user. In some instances, the point of interest may be in close proximity to the user. However, the point of interest need not be in close proximity to the user. Rather, the point of interest may simply be visible to the user in the distance.

The notification may be provided such that it is considered non-intrusive by the user. For example, the notification may be a vibration of the mobile device. As another example, the notification may be an audio notification.

The manner in which the notification is transmitted may be ascertained from a set of notification preferences of the user. Example notification preferences include, but are not limited to, manner of transmission (e.g., vibration, audio ring tone, or audio message), volume, period of time or number of times the notification is to be provided, device identifier identifying the mobile device via which the notification is to be transmitted, condition to be satisfied before the notification is provided, and/or event(s) that will result in termination or cancelling of the notification. For example, the set of notification preferences may indicate that a notification pertaining to McDonald's restaurants in the user's field of vision be provided via a vibration, while all other notifications be provided via an audio notification. As another example, the set of notification preferences may indicate that when an individual that the user knows enters or is in the user's field of vision, an audio notification providing the name of the individual should be transmitted. As a result, when the user turns in a direction facing the individual, the user will be prompted with the individual's name.

A notification may be provided until it is completed according to the notification preferences. In some instances, the notification may be provided until the user responds.

In some embodiments, once a notification has been provided, the user may choose to respond to the notification or ignore the notification. For example, the user may choose to terminate the notification by performing an event such as shaking the mobile phone or pressing a button on the mobile phone. As another example, the user may choose to enter a store for which a notification was provided.

The user's response to a notification or lack thereof may be obtained or detected as feedback. The feedback may be recorded in the user profile, and may be used to update a machine learning algorithm that selects content and/or notifications to be provided to the user.

Further content and/or notifications may be provided to the user based, at least in part, upon the feedback that has been detected or obtained. For example, if the user enters a store for which a notification is provided, the user's activity may be recorded in the user profile as a positive response with respect to the store. In the future, notifications may continue to be provided to the user when the user encounters the store or a similar store. As another example, if the user does not enter a store for which a notification is provided, the user's activity may be recorded in the user profile as a negative response with respect to the store. In the future, it may be less likely that notifications will be provided to the user when the user encounters the store or a similar store.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Social Network

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

Multi-Modal Communication (MMC)

Individuals within one or more social networks may interact or communicate with other members of a social network via a variety of devices. Multi-modal communication technologies refers to a set of technologies that permit interoperable communication across multiple devices or platforms, such as cellphones, smart phones, tablet computing devices, personal computers, televisions, SMS/MMS, email, instant messenger clients, forums, social networking sites (such as Facebook, Twitter, or Google), or the like.

Network Architecture

Figure 4:
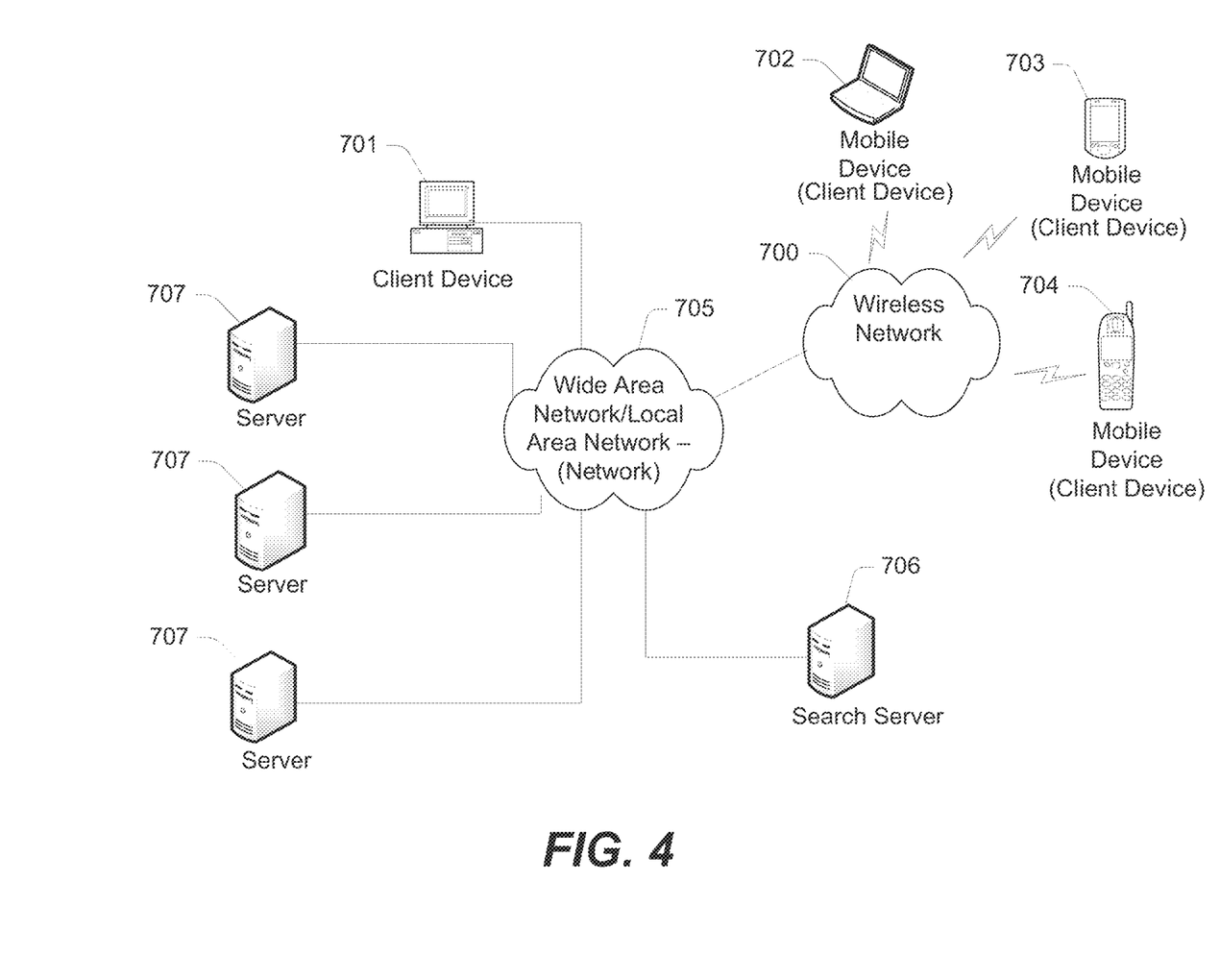
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), hand-held computing devices (e.g., PDAs), cell phones, or any other type of computing or communication platform.

The disclosed embodiments may be implemented in some centralized manner. This is represented in FIG. 4 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

Crawler

A crawler may be operable to communicate with a variety of content servers, typically via a network. In some embodiments, a crawler starts with a list of URLs to visit. The list may be called a seed list. As the crawler visits the URLs in the seed list, it identifies all the hyperlinks in the page and adds them to a list of URLs to visit, called the crawl frontier. URLs from the crawler frontier are recursively visited according to a set of policies. A crawler typically retrieves files by generating a copy for storage, such as local cache storage. A cache refers to a persistent storage device. A crawler may likewise follow links, such as HTTP hyperlinks, in the retrieved file to additional files and may retrieve those files by generating copy for storage, and so forth. A crawler may therefore retrieve files from a plurality of content servers as it "crawls" across a network.

Indexing

An indexer may be operable to generate an index of content, including associated contextual content, such as for one or more databases, which may be searched to locate content, including contextual content. An index may include index entries, wherein an index entry may be assigned a value referred to as a weight. An index entry may include a portion of the database. In some embodiments, an indexer may use an inverted index that stores a mapping from content to its locations in a database file, or in a document or a set of documents. A record level inverted index contains a list of references to documents for each word. A word level inverted index additionally contains the positions of each word within a document. A weight for an index entry may be assigned. For example, a weight, in one example embodiment may be assigned substantially in accordance with a difference between the number of records indexed without the index entry and the number of records indexed with the index entry.

Client Device

Figure 5:
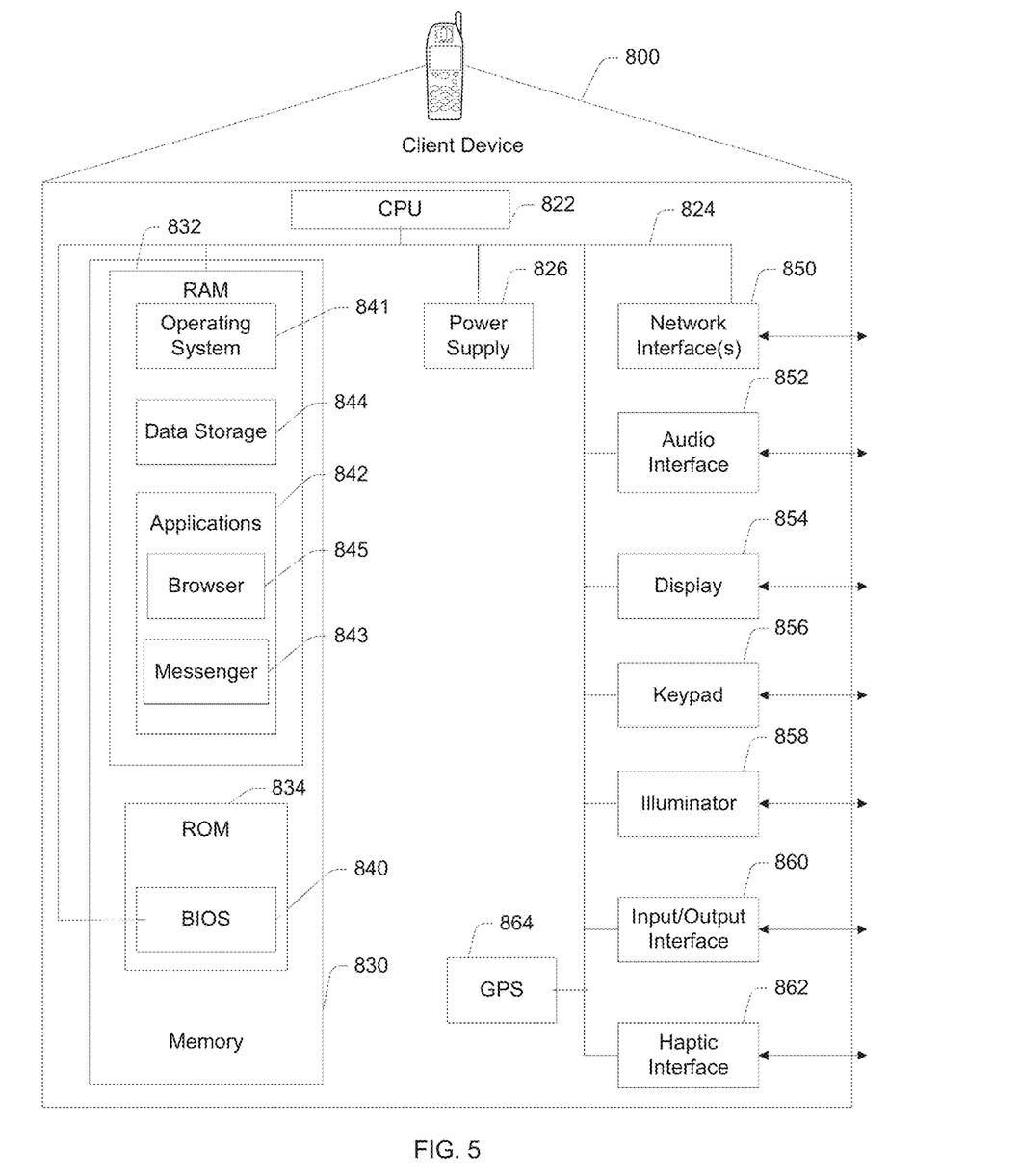
FIG. 5 is a schematic diagram illustrating an example client device in which various embodiments may be implemented.

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Figure 6:
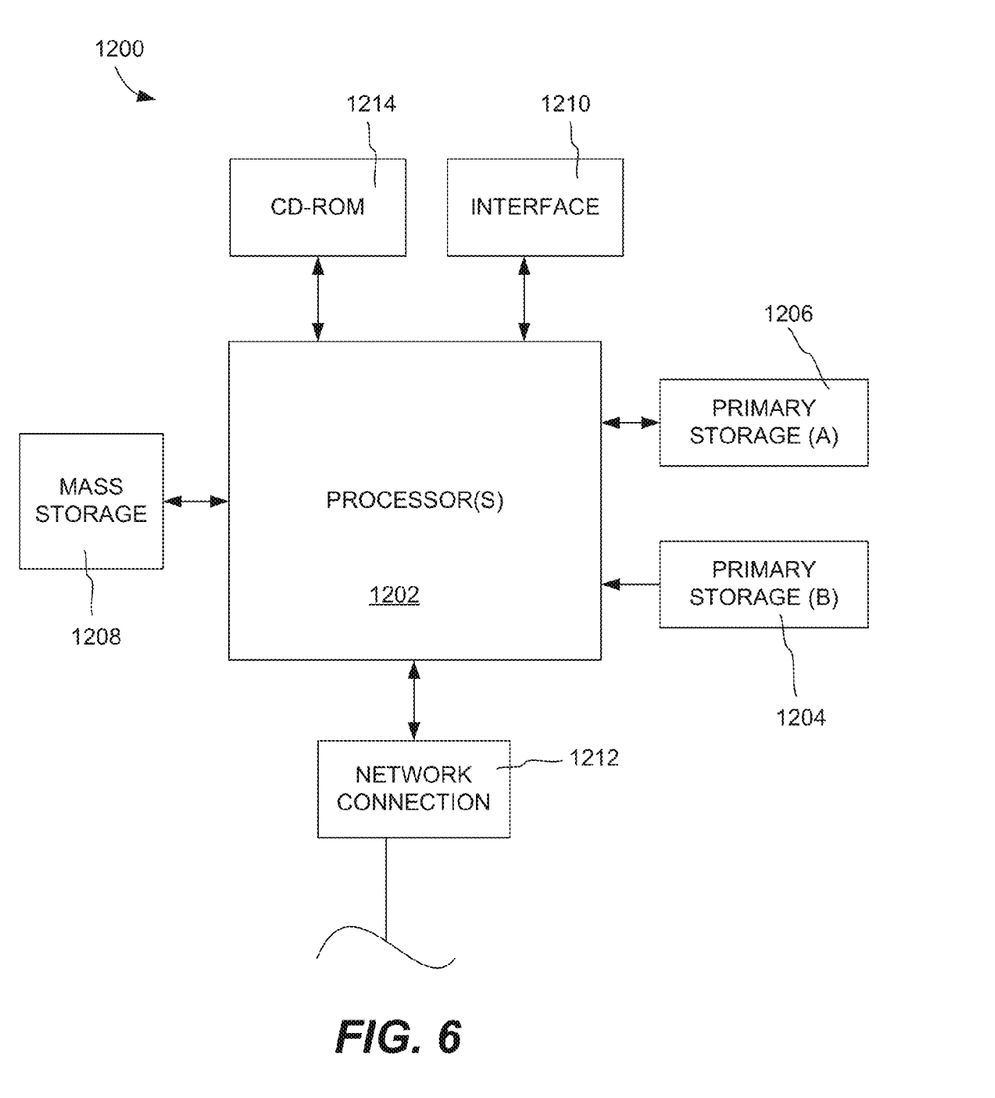
FIG. 6 is a schematic diagram illustrating an example computer system in which various embodiments may be implemented.

FIG. 6 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive, and are not to be limited to the details given herein, but may be modified within the scope and equivalents of the appended claims.

What is claimed is:

1. A method, comprising:
   obtaining a location of a mobile device;
   ascertaining a direction of movement of the mobile device;
   determining a field of vision of a user of the mobile device based, at least in part, on the location of the mobile device and the direction of movement of the mobile device, wherein determining the field of vision of the user includes estimating an area that extends outward from the user;
   identifying a point of interest within the field of vision of the user; and
   providing a notification via the mobile device based, at least in part, upon the point of interest within the field of vision of the user.

2. The method as recited in claim 1, wherein the notification comprises a vibration of the mobile device.

3. The method as recited in claim 1, wherein the notification pertains to the point of interest in the field of vision of the user.

4. The method as recited in claim 1, wherein the point of interest is a product, wherein the notification pertains to a coupon for the product.

5. The method as recited in claim 1, wherein the notification is provided when the point of interest enters into the field of vision of the user.

6. The method as recited in claim 1, wherein identifying the point of interest within the field of vision of the user is performed based, at least in part, upon signals emitted by a Radio Frequency Identifier (RFID) tag;
  wherein the notification pertains to the one or more points of interest in the field of vision of the user.

7. The method as recited in claim 1, wherein identifying the point of interest within the field of vision of the user is performed based, at least in part, upon detection of signals emitted by a device or entity other than the mobile device and/or pattern recognition;
  wherein the notification pertains to the points of interest in the field of vision of the user.

8. An apparatus, comprising:
  a processor; and
  a memory, at least one of the processor or the memory being adapted for:
    obtaining a location of a mobile device;
    ascertaining a direction of movement of the mobile device;
    determining a field of vision of a user of the mobile device based, at least in part, on the location of the mobile device and the direction of movement of the mobile device, wherein determining the field of vision of the user includes estimating an area that extends outward from the user;
    identifying a point of interest within the field of vision of the user; and
    providing a notification via the mobile device based, at least in part, upon the point of interest within the field of vision of the user.

9. The apparatus as recited in claim 8, wherein the notification comprises a vibration of the mobile device.

10. The apparatus as recited in claim 8, wherein the notification pertains to the point of interest in the field of vision of the user.

11. The apparatus as recited in claim 8, wherein the point of interest is a product, wherein the notification pertains to a coupon for the product.

12. The apparatus as recited in claim 8, wherein the notification is provided when the point of interest enters into the field of vision of the user.

13. The apparatus as recited in claim 8, at least one of the processor or the memory being further adapted for:
  identifying the point of interest within the field of vision of the user based, at least in part, upon signals emitted by a Radio Frequency Identifier (RFID) tag;
  wherein the notification pertains to the one or more points of interest in the field of vision of the user.

14. The apparatus as recited in claim 8, at least one of the processor or the memory being further adapted for:
  identifying the point of interest within the field of vision of the user based, at least in part, upon detection of signals emitted by a device or entity other than the mobile device and/or pattern recognition;
  wherein the notification pertains to the points of interest in the field of vision of the user.

15. A system, comprising:
  one or more computing devices configured to:
    obtain a location of a mobile device;
    ascertain a direction of movement of the mobile device;
    determine a field of vision of a user of the mobile device based, at least in part, on the location of the mobile device and the direction of movement of the mobile device, wherein determining the field of vision of the user includes estimating an area that extends outward from the user;
    identify a point of interest within the field of vision of the user; and
    provide a notification via the mobile device based, at least in part, upon the point of interest within the field of vision of the user.

16. The system as recited in claim 15, wherein the notification comprises a vibration of the mobile device.

17. The system as recited in claim 15, wherein the notification pertains to the point of interest in the field of vision of the user.

18. The system as recited in claim 15, wherein the point of interest is a product, wherein the notification pertains to a coupon for the product.

19. The system as recited in claim 15, wherein the notification is provided when the point of interest enters into the field of vision of the user.

20. The system as recited in claim 15, the computing devices being further configured to identify the point of interest within the field of vision of the user based, at least in part, upon at least one of: signals emitted by a Radio Frequency Identifier (RFID) tag, signals emitted by a device or entity other than the mobile device, or pattern recognition;
  wherein the notification pertains to the points of interest in the field of vision of the user.

* * * * *